(12) United States Patent
Stutz

(10) Patent No.: US 10,451,736 B2
(45) Date of Patent: Oct. 22, 2019

(54) ELECTRO-OPTICAL DISTANCE MEASUREMENT METHOD AND EQUIVALENT DISTANCE METER

(71) Applicant: LEICA GEOSYSTEMS AG, Heerbrugg (CH)

(72) Inventor: Reto Stutz, Berneck (CH)

(73) Assignee: LEICA GEOSYSTEMS AG, Heerbrugg (CH)

(*) Notice: Subject to any disclaimer, the term of this patent is extended or adjusted under 35 U.S.C. 154(b) by 890 days.

(21) Appl. No.: 15/072,102

(22) Filed: Mar. 16, 2016

(65) Prior Publication Data
US 2016/0274237 A1 Sep. 22, 2016

(30) Foreign Application Priority Data

Mar. 18, 2015 (EP) .................................. 15159580

(51) Int. Cl.
G01C 3/08 (2006.01)
G01S 17/10 (2006.01)
(Continued)

(52) U.S. Cl.
CPC .............. *G01S 17/10* (2013.01); *G01S 7/484* (2013.01); *G01S 7/4865* (2013.01); *G01S 17/36* (2013.01); *G01S 7/4815* (2013.01); *G01S 17/87* (2013.01)

(58) Field of Classification Search
CPC ........ G01S 17/10; G01S 7/484; G01S 7/4865; G01S 17/36; G01S 7/4815; G01S 17/87
See application file for complete search history.

(56) References Cited

U.S. PATENT DOCUMENTS 5,995,233 A * 11/1999 Ohtomo ............... G01C 15/006
356/400
6,115,112 A 9/2000 Hertzman et al.
(Continued)

FOREIGN PATENT DOCUMENTS

AT 355096 B 2/1980
CN 101490503 A 7/2009
(Continued)

OTHER PUBLICATIONS

European Search Report dated Sep. 24, 2015 as received in Application No. EP 15 15 9580.

*Primary Examiner* — Samantha K Abraham
(74) *Attorney, Agent, or Firm* — Maschoff Brennan

(57) ABSTRACT

Some embodiments of the invention may include an electro-optical distance measurement method having at least one emission of a light signal, in particular of laser light, from at least one light source onto a target object, detection of a fraction of the light signal returning from the target object using a detector and a signal processing electronics system connected downstream from the detector, and/or determination of a distance to the target object. In some embodiments, the emitted light signal comprises in this case a sequence of sequential elements of, in each case at least one light pulse and one light signal train. In some embodiments, the light pulses each have a higher intensity amplitude than the light signal trains. Some embodiments may also an electro-optical distance meter having the features analogous to The distance measurement method according to the invention.

20 Claims, 4 Drawing Sheets

(51) Int. Cl.
  *G01S 17/36* (2006.01)
  *G01S 7/484* (2006.01)
  *G01S 7/486* (2006.01)
  G01S 17/87 (2006.01)
  G01S 7/481 (2006.01)

(56) References Cited

U.S. PATENT DOCUMENTS

| | | |
|---|---|---|
| 6,781,675 B2 | 8/2004 | Gogolla et al. |
| 7,812,933 B2 | 10/2010 | Jensen et al. |
| 2009/0262330 A1 | 10/2009 | Siercks |
| 2010/0296078 A1 | 11/2010 | Forrer et al. |
| 2013/0050676 A1 | 2/2013 | d'Aligny |
| 2013/0235366 A1 | 9/2013 | Giacotto et al. |
| 2015/0369919 A1 | 12/2015 | Pollmer |

FOREIGN PATENT DOCUMENTS

| | | |
|---|---|---|
| DE | 2351233 A1 | 4/1975 |
| DE | 102013003186 B3 | 5/2014 |
| EP | 1 351 070 B1 | 1/2009 |
| EP | 2637038 A1 | 9/2013 |
| WO | 2008009387 A1 | 1/2008 |

\* cited by examiner

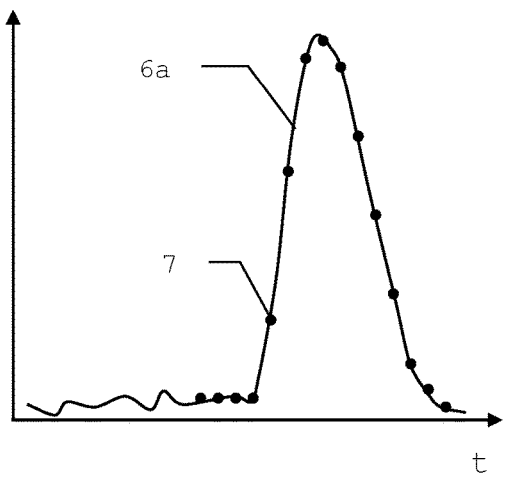
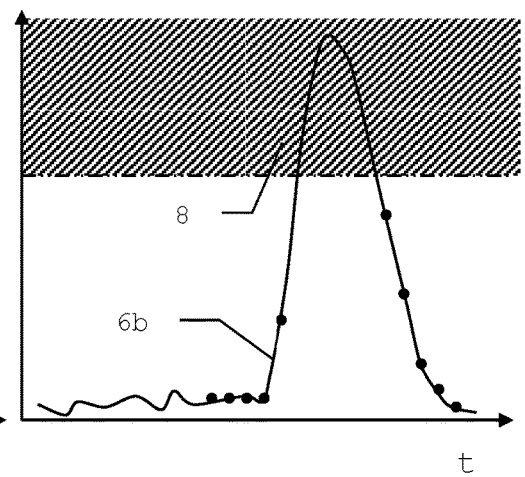
Fig. 3a    Fig. 3b
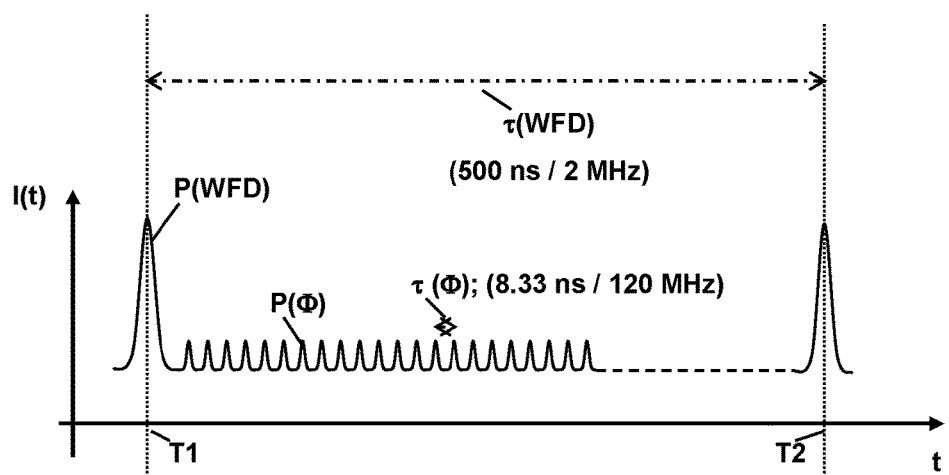
Fig. 4

ELECTRO-OPTICAL DISTANCE MEASUREMENT METHOD AND EQUIVALENT DISTANCE METER

FIELD OF THE INVENTION

The invention relates to an electro-optical distance measurement method, which comprises at least one emission of a light signal, in particular laser light, onto a target object, a detection of a fraction of the emitted light signal returning from the target object using a detector and a signal processing electronics system connected downstream from the detector, and a determination of a distance to the target object using a control and analysis component. The invention also relates to an electro-optical distance meter analogous to the distance measurement method according to the invention.

BACKGROUND

Various principles and methods are known in the field of electronic or electro-optical distance measuring. One approach is to emit pulsed electromagnetic radiation, for example, laser light, onto a target to be measured and subsequently to receive an echo from this target as the backscattering object, wherein the distance to the target to be measured can be determined on the basis of the runtime of the pulse. Such pulse runtime meters have prevailed in many fields as standard solutions over time.

Two different approaches are typically used for detection of the backscattered pulse.

In the so-called threshold value method, a light pulse is detected when the intensity of the radiation incident on a detector of the distance meter used exceeds a specific threshold value. This threshold value prevents noise and interfering signals from the background from being incorrectly detected as a useful signal, i.e., as the backscattered light of the emitted pulse.

However, it is problematic that with weak backscattered pulses, as are caused by a greater measurement distances, for example, detection is no longer possible if the pulse intensity falls below the detection threshold, i.e., below the threshold value. The essential disadvantage of this threshold value method is therefore that the amplitude of the measurement signal has to be significantly greater than the noise amplitude of optical and electrical noise sources in the signal path, to sufficiently minimize incorrect detections, so that for measurements at relatively large distances, the threshold value method is only capable of limited use.

The other approach is based on the sampling of the backscattered pulse. An emitted signal is detected in that the radiation acquired by a detector is sampled, a signal is identified within the sampled range, and finally the location thereof is determined chronologically. Due to the use of a plurality of sampling values and/or addition of the received signal synchronous with the emission rate, a useful signal can also be identified under unfavorable circumstances, so that greater distances or background scenarios which are noisy or subject to interference can also be managed.

Currently, the entire waveform of the analog signal of the radiation acquired by a detector is frequently sampled in this case. After identification of the coding of the associated transmitted signal (ASK, FSK, PSK, etc.) of a received signal, a pulse runtime is determined very accurately from a defined progress point of the sampled and digitized signal, for example, the inflection points, the curve maxima, or integrally by means of an optimum filter known from time interpolation.

The limited linear modulation range of the electronic receiver circuit is problematic. At close range, the signal can saturate the receiver, so that the coding of the transmitted signal is no longer correctly ascertained or the runtime is determined insufficiently accurately.

One prohibitive disadvantage of signal sampling is thus that in the state of a saturated receiving electronics system due to excessively strong received light intensities, i.e., in particular in the case of short distances to the target object, suitably analyzable items of information of the measurement signal are no longer available, because then an actual signal profile can no longer be established as a result of detector saturation.

WO 2008/009387 describes in this case for pulse runtime measurements (ToF, Time-of-Flight) that alternatively—i.e., depending on which signal dynamic range of the receiver is addressed by the returning signal—either the threshold value method (with strong returning signal) or the sampling method WFD (with weaker returning signal) can be used.

A measurement method by means of signal sampling is known from U.S. Pat. No. 6,115,112, in which an approximate chronological establishment of the arrival time of the pulse is performed by a previously carried out coarse measurement. The actual distance measurement is then performed in the scope of a fine measurement for a further light pulse, the restricted possible arrival time of which is efficiently sampled.

Therefore, the measurement is allocated into a coarse measurement and a fine measurement. The application of this approach necessarily requires a sequential sequence of measurements, because a time window, in which the sampling measurements follow, is first defined by the threshold value measurement. A chronologically separated sequence of coarse and fine measurements on different pulses therefore takes place.

Either the restriction of the signal detection by a detection threshold or, however, the necessity of establishing a time window (coarse distance) for the sampling therefore represent the essential disadvantages of the above-described known measurement principles according to the pulse runtime principle.

SUMMARY

Some embodiments of the present invention provide a distance measurement method or distance meter, by which the disadvantages known from the prior art are avoided, wherein rapid and precise measurements are enabled for both short and also long distances.

This object is achieved by the implementation of the characterizing features of the independent claims. Features which refine the invention in an alternative or advantageous manner can be inferred from the dependent patent claims.

The subject matter of the invention is an electro-optical distance measurement method, which comprises at least one emission of a light signal, in particular of laser light, onto a target object, a detection of a fraction of the light signal returning from the target object using a detector (and a signal processing electronics system connected downstream from the detector), and a determination of a distance to the target object (using a control and analysis component).

According to the invention, the emitted light signal comprises a sequence of sequential elements of at least one light pulse P(TOF) and one light signal train P($\Phi$) each, wherein the light pulses P(TOF) each have a higher intensity amplitude I than the light signal trains P(Φ).

In some embodiments, the emission of a light pulse P(TOF) is followed in each case immediately directly thereon by the emission of a light signal train P(Φ), i.e., essentially without delay. In each case a light pulse P(TOF) and a light signal train P(Φ) are therefore each more or less directly in succession in the air on the path to the target and back. Alternatively, however, the respective light signal train P(Φ), for example, can also be chronologically emitted (timed) so that it lies chronologically in the middle between in each case two successively emitted light pulses P(TOF).

In some embodiments, the light pulses P(TOF) are configured in this case with respect to the intensity amplitude I thereof so that the fractions returning from a target object—which is located in a moderate distance range for the respective application of the distance measurement method—are provided for activating the detector in its upper amplitude range upon detection by the detector; and the light signal trains P(Φ) are configured with respect to the intensity amplitude I thereof so that the fractions returning from a target object—which is located in a moderate (and optionally also close) distance range for the respective application of the distance measurement method—are provided for activating the detector in its linear amplitude range upon detection by the detector.

This specification with respect to the selected intensities for light pulses and light signal trains is provided for a target having average reflection properties for the respective provided application.

Depending on the application, there are thus situations having—in the relationship for this application—strong returning signals (for example, short distances and/or high reflection on the target) and having—in the relationship for this application—comparatively weak signals (for example, long distances and/or low reflection). The statements made above relate in this case to returning signals in the—in the relationship for the relevant application—moderate intensity range (i.e., to moderately strong/moderately weak returning signals for the respective application). The intensities of the light pulses P(TOF) and the light signal trains P(Φ) are then selected so that for the moderately strong/weak returning signals—in the relevant application sector—the returning fractions of the light pulses P(TOF) activate the detector in its upper amplitude range and the returning fractions of the light signal trains P(Φ) activate the detector in its linear/middle amplitude range.

This enables, for example, that, depending on the amplitude range, in which the detector is activated in each case by the detected returning fractions of the sequential elements:
  only the respective detected returning fraction of the light pulse P(TOF) is used with respect to a chronological location—more or less in the single shot method—for the distance determination (with—in the relationship for this application—comparatively weak signals, i.e., for example, long distances and/or low reflection) or
  only the respective detected returning fraction of the light signal train P(Φ) is used for the distance determination (then—in the relationship for this application—with comparatively strong signals, i.e., for example, shorter distances and/or higher reflection on the target object, wherein the detector is in or at least close to saturation due to the returning fractions of the light pulse here).

Furthermore, the respective detected returning fraction of the light pulse P(TOF) and the respective detected returning fraction of the light signal train P(Φ) can also be used jointly for the distance determination, in particular wherein in each case an item of information about the determined chronological location of the returning fraction of the light pulse P(TOF) is taken into consideration in the scope of the analysis of the returning fraction of the light signal train P(Φ) of the same sequential element.

A situation-related selection (i.e., depending on the strength of the returning signal) can thus be set, so that depending on the strength of the returning signal, either only the returning light pulses or alternatively only the returning light signal trains are analyzed; or a situation-related selection can also be set, wherein a selection is made from the three analysis variants depending on the strength of the returning signal (->only returning light pulse, only returning light signal train, or both jointly); or both returning signal fractions—if possible—can also always be used for the analysis.

On the basis of this emission according to the invention of—in direct succession—one TOF light pulse and one light signal train in each case, the entire dynamic range can therefore be covered, without test measurements (in the meaning of previous measurements/coarse measurements) on the target being necessary. The actual measurement can be performed immediately and then, without time delay, the analysis adapted to the respective strength of the respective returning signal (either of the TOF light pulse or the light signal train) can be performed. According to the invention, an amplitude allocation can thus be performed, in which the two sequential element types (high-powered TOF signal and light signal train) cover the entire required signal dynamic range—for the respective application—practically without a gap.

The light pulses P(TOF) are each modulated in this case so that the fractions thereof returning from the target object are provided to be analyzed according to the pulse runtime method TOF. The analysis can thus—as is known per se—be provided by means of a digital filter method for determining the runtime (for example, either according to the waveform digitization method WFD—using chronological sampling of the returning TOF pulse—or also using a digital threshold value method).

In one exemplary embodiment, the light signal trains P(Φ) can each comprise in this case, for example, a sequence of light signal train light pulses, which lie comparatively close to one another with respect to time and in particular are emitted quasi-continuously, each of lower amplitude in comparison to the light pulses P(TOF). In particular, the individual light signal train light pulses P(Φ) can be emitted, for example, at a repetition frequency of between 10 MHz and 100 GHz, especially at a repetition frequency of between 50 MHz and 1000 MHz.

Furthermore, the light signal train light pulses (as is already known per se for the emission of many pulses in succession) per light signal train P(Φ) can each be accumulated on the receiver side or analysis side to ascertain an average runtime for the entire respective light signal train P(Φ) in each case.

The light signal trains P(Φ) can also, however, according to one exemplary embodiment, each comprise a sequence of between only 2 and 50 light signal train light pulses (in particular even also two light signal train light pulses of different amplitude again). In the extreme case, a light signal train which consists of only one light signal train light pulse is also implementable in this case.

According to a further aspect of the invention, the detected returning fractions of the light pulses P(TOF) and light signal trains P(Φ) can each be sampled and digitized by the signal processing electronics system and digital data can be generated in this case, which are used for the further analysis, in particular by an FPGA, an SoC, or a microprocessor. In particular, in the scope of the detection, the returning light signal can be progressively chronologically sampled and digitized in its entirety in this case (in particular by the same signal processing circuit having sampling unit), in particular at a sampling rate of between 50 MS and 20 GS, especially of between 200 MS and 2 GS.

According to a further aspect of the invention, the runtime light pulses P(TOF) and the light signal trains (P(Φ)) can have the same or also different carrier wavelengths.

Furthermore, the light pulses P(TOF) and the light signal trains P(Φ) can also be emitted either from the same light source or also from different light sources. In this case, for example, the light pulses P(TOF) can advantageously be emitted from a laser source and the light signal trains P(Φ) can be emitted from a superluminescent diode SLD.

According to one embodiment of the invention, the light signal trains P(Φ) can also each be modulated so that the fractions thereof returning from the target object are provided for being analyzed according to the phase comparison method Φ. The detected returning fractions of the light pulses P(TOF) are then analyzed with respect to a chronological position and the detected returning fractions of the light signal trains P(Φ) are analyzed with respect to a phase position.

In this case, the light signal trains P(Φ) can each cover, for example, a duration of between 40 and 95% of the time interval between two successive light pulses P(TOF) of the signal sequence.

The time interval Δ(TOF) between two successive light pulses P(TOF) can furthermore be between, for example, 50 ns and 2000 ns.

The phase comparison light signal train can also be acquired and analyzed in this case according to the waveform digitization method WFD. The phase determination can be performed in this case, for example, using a high-resolution fine interpolation algorithm.

In the scope of the detection, according to the above-mentioned aspects of the invention, signal sampling can thus be performed for identification and determination of a chronological position of the returning fraction of the TOF light pulse (i.e., sampling and analysis of the TOF pulse according to the waveform digitization method WFD) and—in parallel thereto—an analysis of the detected returning fraction of the phase comparison light signal train can be performed according to the phase comparison method Φ.

The light signal thus then comprises, as a whole, a sequence of TOF light pulses and light signal trains, wherein these are each chronologically interleaved, so that alternately and in particular in chronological succession, a sampling light pulse P(TOF) and a phase comparison light signal train P(Φ) are each emitted.

The phase comparison light signal trains can also be emitted continuously over the entire measurement or optionally scanning duration, i.e., continuously during the emission of a plurality of TOF pulses, wherein, for example, the signals of the signal sequences (low-frequency TOF pulses and high-frequency phase measurement method signal, in particular in the form of high-frequency Φ pulses) are then subtracted from one another or added to one another in a suitable manner, for example, with a corresponding relative scaling, for an analysis.

The method is thus based, in one embodiment of the invention, on a combination of solely a runtime method (TOF) with a type of phase comparison method. In this case, the receiver principle WFD (waveform digitizing) can be used jointly for both signal modulations, wherein the signal processing and analysis, in contrast, is advantageously designed differently. In this case, a light signal having components of two types are emitted toward a target object, on the one hand, TOF pulses of relatively high intensity correspond to typical pulses used for the pulse runtime method (TOF method), for example, having an intensity of 50 nJ and a low repetition rate in comparison, for example, 2 MHz, corresponding to a time interval of 500 ns between two successive TOF runtime pulses, and, on the other hand, a light signal train of lower intensity, in particular in the form of light signal train light pulses, i.e., a train of pulses of relatively lower intensity and comparatively higher frequency, for example, having an intensity of 1 nJ and a frequency of 120 MHz corresponding to a time interval of 8.33 ns between two individual successive light signal train light pulses. The intensive TOF pulses are designed so that they can be reliably sampled and analyzed, also at greater distances to the target object (for example, of greater than 30 m) by signal processing electronics components for the sampling method. In particular in the case of comparatively shorter distances, i.e., for example, less than 30 m, however, it is also possible that detectors used for the detection of the light backscattered from the target object are saturated, i.e., overloaded by strong light signals, so that a highly accurate determination of the pulse runtime and therefore the distance to the target object is no longer sufficiently possible "only" on the basis of the TOF method, even if in this case a somewhat coarser distance determination is still ensured. In contrast, the weaker light signal train light pulses are dimensioned so that the reflected light signals thereof do not result in detector saturation and the signals thereof can be processed by components of the signal processing electronics system, for example, for the phase comparison method.

According to the invention, at close range (for distances of approximately, for example, less than 25 or 30 m)—i.e., thus in the upper dynamic range above the saturation limit in the returning TOF pulse—an analysis of the signal (with analysis of the returning light signal trains in each case) can decisively be performed, for example, with application of the phase comparison method or the accumulation method, and at long range (i.e., for distances greater than approximately 25 or 30 m, for example)—i.e., thus in the lower dynamic range—an analysis of the TOF pulses can predominantly be performed, for example, according to the waveform digitization and runtime determination method. The accuracy in the distance determination is thus decisively influenced at close range by application of the phase comparison method or accumulation method, and at long range by application of the TOF method.

The strengths of the two methods are therefore advantageously combined according to the invention and the weaknesses (TOF method at close range, because of oversaturation; and phase comparison/accumulation at long range, inter alia, because of weak detection signal) are each supported by the other method.

Furthermore—as a synergistic effect—the distance information obtained via the TOF method (even if it is comparatively not as accurate at close range with oversaturating TOF pulse) can also be incorporated for the analysis according to the phase comparison method in this case, in particular to resolve ambiguities in the phase comparison.

The ambiguities in a distance measurement according to the phase comparison method/accumulation method, which typically exist for the phase comparison method, as soon as the phase shift has exceeded one wavelength (or the small light signal train pulses require unambiguous assignment)

can be resolved here according to the invention, because the distance information to the target obtained on the basis of the TOF analysis of the TOF pulse can be used for this purpose (even if it may be somewhat inaccurate for targets located at close range).

Double targets, i.e., acquisition of multiple objects by the same pulse, can also be recognized by appropriate dimensioning of the TOF pulses and taken into consideration accordingly in the data analysis.

A lack of ambiguity in the analysis of multiple emitted light signal trains can be ensured, for example, in that the respective light signal trains are modulated using different patterns, i.e., the modulation of the phase comparison light signal train is changed after each emission of a TOF pulse.

Alternatively or additionally, however, this can also be performed in that the time intervals between each two emitted TOF pulses known as sequential elements vary or, however, in that double TOF pulses are used as the respective sequential elements and in this case the brief duration between the double pulses is varied.

The repetition rate of the emission of the sequential elements (i.e., the repetition rate in the emission of the TOF pulses and light signal trains in each case) can be dimensioned so that in general two TOF pulses are never underway on the path between light source and detector. If a coding is used, for example, as explained in the previous paragraphs (for example, known variation of the time intervals of the emitted TOF light pulses), it is sufficient if simply two or more TOF pulses (or light signal trains) of the same coding are never underway on the path between light source and detector.

According to the invention—as already mentioned above—the light signal train can thus also comprise within a train, for example, a sequence of Φ light pulses, which lie comparatively close to one another chronologically and are especially emitted quasi-continuously, each of lower amplitude. However—as also already mentioned once—it is also possible to only emit 2 to 5 pulses in the scope of the light signal train (optionally also in each case with different amplitude once again within a train, so that, for example, including the high-energy TOF pulse, "large-moderate-small-still smaller" then results for the amplitudes of the successively emitted pulses).

In particular, for a single measured value determination, a repetition of a plurality, in particular of two or more single measurements can also be performed in each case, and the individual signals thereof can then be averaged in measurements and determinations of the returning fractions of the high-energy TOF pulse and/or the light signal trains to ascertain the single measured value.

In particular, in the scope of the detection, the returning light signal is progressively chronologically sampled and digitized in its entirety, in particular at a sampling rate of between 50 MS/s and 20 GS/s (i.e., megasamples or gigasamples per second), especially of between 200 MS/s and 2 GS/s. The analysis of the returning light signal train, for example, according to the phase comparison method Φ or accumulation method is executed in particular as a type of digital phase measurement by means of directly sampled signal form (WFD) or WFD analysis on a pulse train (or the pulse arising due to the pulse train averaging) (direct sampling).

A further subject matter of the invention is an electro-optical distance meter having at least one light source for emitting at least one light signal, in particular laser light, onto a target object, a receiving circuit having a receiver for detecting the light signal backscattered from the target object, wherein the receiver comprises in particular at least one sampling unit for sampling the light signal returning from the target object, and having a control and analysis component for determining a distance to the target object. According to the invention, an emission controller is provided, which is configured and programmed such that the distance measurement method according to one of the above-described embodiments is carried out thereby in operation of the distance meter.

In particular, the receiving circuit is provided with a sampling and digitization unit for signal sampling of the respective detected returning fractions of the light pulses P(TOF) and the light signal trains P(Φ) and generating digital data, which are then usable for further analysis.

According to one possible aspect, the same sampling unit can be provided in the receiving circuit for acquiring and sampling both returning fractions of the TOF light pulse in each case and also of the light signal train in each case.

According to different embodiments of the distance meter according to the invention, the light source is formed as a single light source for emitting light signals having the same or having multiple different wavelengths.

According to one special embodiment of the distance meter according to the invention, two different (partial) light sources can be provided in this case, one of them for emitting the light pulses P(TOF) and the other for emitting the light signal trains P(Φ). In this case, for example, the light pulses P(TOF) can advantageously be emitted from a laser source and the light signal trains P(Φ) can be emitted from a superluminescent diode SLD. In addition, for example, a light amplifier can be arranged downstream from one of the two light sources, in particular the superluminescent diode SLD, or optionally also both light sources in the optical light path, in particular an erbium-doped fiber amplifier EDFA or MOPA (Master Oscillator Power Amplifier).

BRIEF DESCRIPTION OF THE DRAWINGS

The invention will be described in greater detail hereafter solely as an example on the basis of specific exemplary embodiments which are schematically shown in the drawings, wherein further advantages of the invention will also be described. In the specific figures:

FIG. 3a shows a schematic illustration of a sampling method for backscattered light signals according to the prior art, FIG. 3b shows a schematic illustration of the saturation problems of the sampling method, FIG. 4 shows an illustration of the distance measurement method according to the invention.

DETAILED DESCRIPTION

Figure 1A:
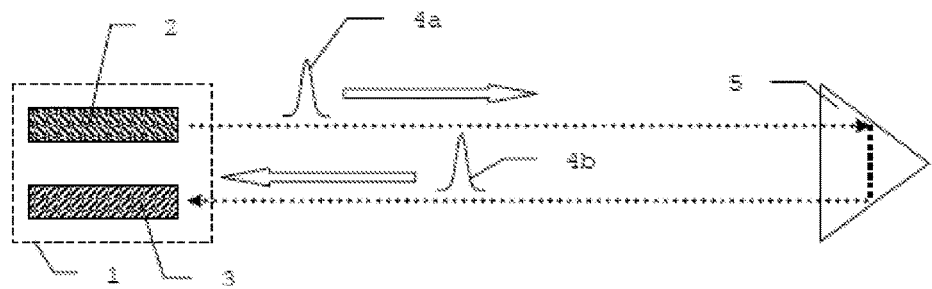
FIG. 1a shows a schematic illustration of an electro-optical distance meter according to the prior art.

FIG. 1a shows a schematic illustration of an electro-optical distance meter 1 of the prior art according to the pulse runtime principle. A transmitter 2 and a receiver 3 are arranged in the distance meter 1. The transmitter 2 emits a light pulse 4a, which, after the reflection or backscattering on a target, for example, a retroreflector 5, is in turn detected as a backscattered light pulse 4b by the receiver 3. Instead of the light pulses, a continuously modulated transmitted signal can also be used according to the invention.

Figure 1B:
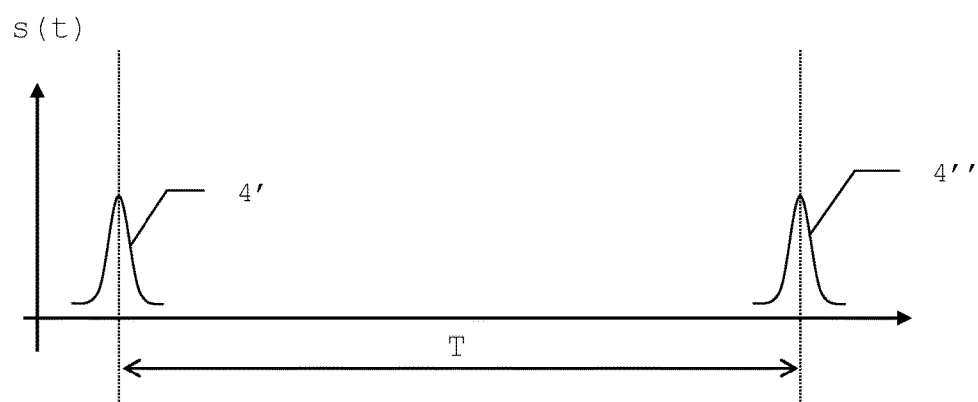
FIG. 1b shows a schematic illustration of a runtime measurement method according to the prior art.

As explained in FIG. 1b in a schematic illustration, the distance is ascertained from the runtime T as the chronological difference between the starting time of the emission of a light pulse 4' and the reception time of the backscattered light pulse 4". The ascertainment of the reception time is performed in this case by the analysis of a feature of the signal pulse s(t), for example, by exceeding a signal threshold or by focal point determination of the integrated pulse profile. In the threshold value method, other methods are also usable for measuring the runtime T, for example, the conversion of the reception signal into a bipolar signal and subsequent determination of the zero crossing.

Figures 2A, 2B:
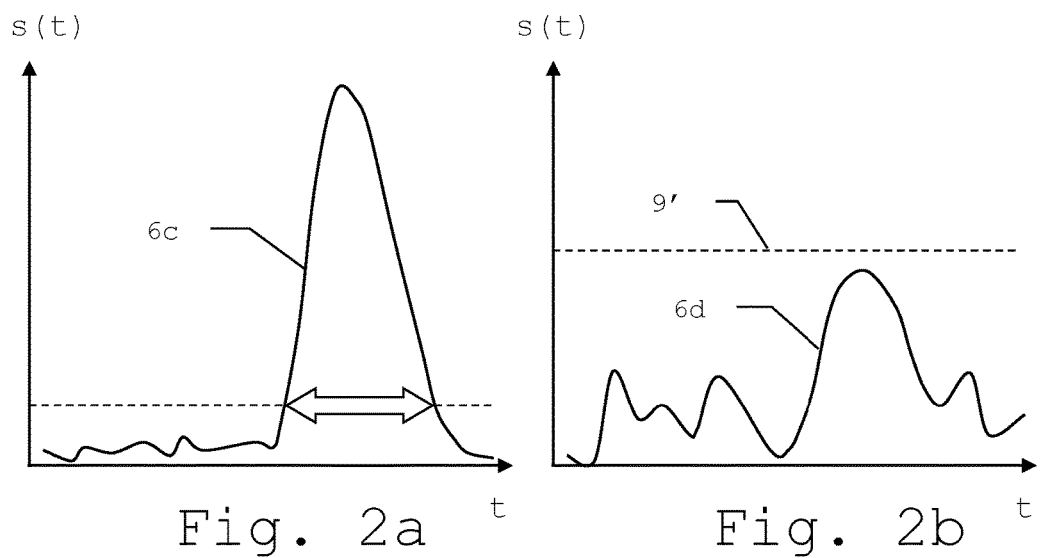
FIG. 2a shows a schematic illustration of a threshold value method for backscattered light signals according to the prior art.
FIG. 2b shows a schematic illustration of the threshold problem of the threshold value method.

In FIG. 2a, a threshold value method for backscattered light signals 6c according to the prior art is explained. To suppress noise, background components, or systematic interfering signals, for example, due to the optical and electrical crosstalk between transmitter signal path and receiver signal path, and exclude them from a detection, a detection threshold 9 is used. Signal intensities s(t) lying below this detection threshold 9 do not result in response of the reception unit, which generates a stop signal, as the discriminator and therefore do not result in detection. If the signal 6c exceeds the detection threshold 9 in its intensity, the detection and therefore the generation of the stop signal and the registration of the reception time are performed. The output signal provided by the threshold value method is therefore dependent on reaching or exceeding the detection threshold 9 by way of the received or input signal. If the signal intensity s(t) always remains, as shown in FIG. 2b, for example, below a detection threshold 9', however, no response of the discriminator occurs and the signal 6d is not detected. This threshold problem of the threshold value method occurs, for example, in the case of large measurement distances or corresponding background influences, which can drive the required threshold level of the threshold signal upward.

The threshold value method alone typically ensures lower distance determination accuracies than the sampling method mentioned hereafter (WFD principle).

FIG. 3a illustrates the principle of a sampling method (WFD) for backscattered light signals according to the prior art. A received signal 6a or the signal profile thereof is sampled at various times 7 or associated time intervals, so that the signal form may be derived. To also be able to detect large variations of the signal pulse s(t), a high dynamic is required on the receiver side, which enables the complete acquisition or sampling of the signal 6a. Otherwise, the situation shown in FIG. 3b can occur, if parts of the signal 6b are outside the dynamic range and a saturation problem of the sampling method occurs. Above a saturation limit, a saturated range 8 of the receiver exists, in which no reasonably usable sampling values of the pulse are available. The sampling of the signal 6b is then restricted to the range lying below the saturation limit. In particular in the case of high flank steepness, a determination of the signal form and location is then difficult.

FIG. 4 shows an illustration of the distance measurement method according to the invention. It is based in one embodiment on a combination of the TOF method (threshold value or WFD) with a phase comparison method ($\Phi$). In this case, light signals of two types are emitted onto a target object, on the one hand, pulses of relatively high intensity corresponding to typical pulses used for the sampling method, for example, having an intensity of 50 nJ and a comparatively low repetition rate, for example, 2 MHz corresponding to a time interval $\tau$(TOF) of 500 ns between two successive pulses P(TOF) at times T1 and T2, which are also referred to hereafter as "TOF pulses", and, on the other hand, pulses of relatively low intensity and comparatively high frequency, for example, having an intensity of 1 nJ and a frequency of 120 MHz, corresponding to a time interval $\tau(\Phi)$ of 8.33 ns between two successive pulses P($\Phi$), as is typical for use in the phase comparison method/pulse accumulation method. These pulses of such a light signal train are also referred to hereafter as "$\Phi$ pulses". The intensive TOF pulses are designed so that they can reliably be sampled and analyzed, also at greater distances to the target object, for example, of greater than 30 m, by signal processing electronics components for the pulse method. In particular in the case of shorter distances, i.e., for example, less than 30 m, however, it is also possible that detectors used for detecting the light backscattered from the target object are saturated, i.e., overloaded by strong light signals, so that a highly accurate determination of the pulse runtime and therefore the distance to the target object is then no longer possible, even if a somewhat coarser distance determination is still ensured in this case (see the case illustrated in FIG. 3b once again in this regard). In contrast, the weaker $\Phi$ pulses are dimensioned so that the reflected light signals thereof do not result in detector saturation and the signals thereof can be processed by the components of the signal processing electronics system for them.

For the measurement pulse combination according to the invention, the pulse runtime is measured for each of the TOF pulses, wherein the analog signal of the entire pulse profile is measured and in this case the runtime is taken for a characteristic point in the time profile, for example, the peak value. In contrast, the $\Phi$ pulses are predominantly not individually analyzed, but rather the phases of the pulses of the emitted pulse train and the phases of the backscattered or reflected pulses are solely compared to one another.

The uncertainty in a distance measurement which typically exists for the $\Phi$ type of method (i.e., phase comparison method/small pulse accumulation method (also to be referred to as small pulse summation and averaging method)), as soon as the phase shift has exceeded a single pulse length, i.e., corresponding to $2\pi$, is not provided here, because—at least with a corresponding selection of the relationship of pulse duration or pulse frequency of TOP pulses and $\Phi$ pulses to one another—it is possible to prevent the phase shift of $2\pi$ from being exceeded, so that a lack of ambiguity is ensured for a distance determination based thereon. Double targets, i.e., acquisition of multiple objects by the same pulse, can also be recognized and taken into consideration in the data analysis accordingly by corresponding dimensioning of the TOF pulses.

The lack of ambiguity is ensured in particular in that the TOF pulses and the Φ pulses are modulated differently and accordingly the modulation is changed after each emission of a TOF pulse.

In the present case, for example, during the period of time (500 ns) between T1 and T2, between two successive TOF pulses, 60 lower-energy Φ single pulses are emitted as a light signal train. The light pulse trains can, in the extreme case, cover 100% of the period of time between two successive TOF pulses. However, time coverages between, for example, 10% and 95% are also possible, especially of 40% or 75%. The Φ pulses can also be emitted continuously over the entire measurement duration, i.e., continuously during the emission of a plurality of TOF pulses, wherein then the signals of the various pulse trains (low-frequency TOF pulses and high-frequency Φ pulses) are subtracted from one another or added to one another in a suitable manner, for example, using a corresponding relative scaling, for example, for an analysis.

Alternatively, however, light pulse trains each made of only 2 to 20 individual lower-energy Φ pulses can also be emitted (optionally even with different intensity amplitudes from one another in each case, as already mentioned above).

Figure 5:
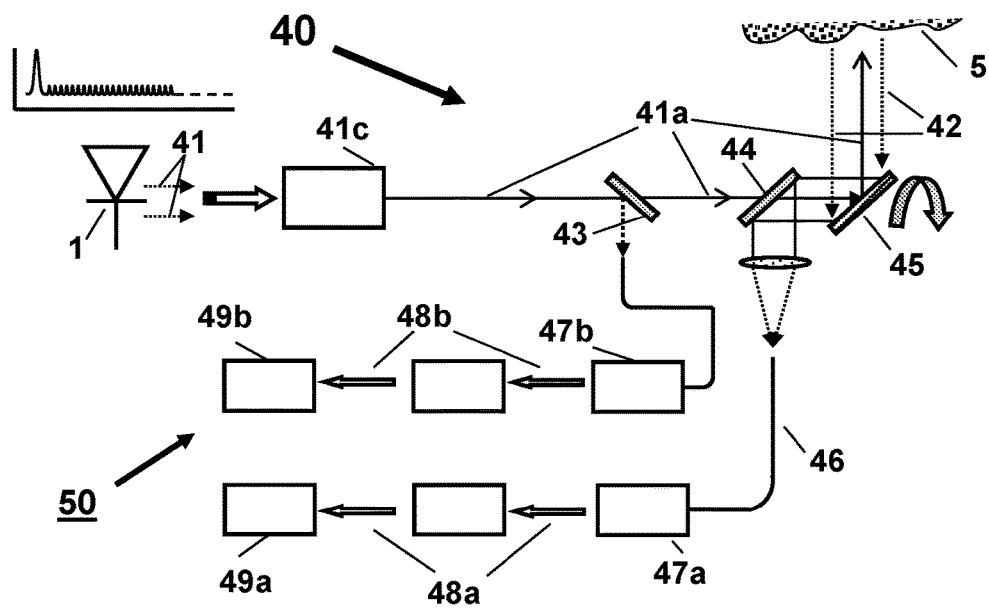
FIG. 5 shows a possible embodiment of an electro-optical distance meter according to the invention.

FIG. 5 shows one possible embodiment of an electro-optical distance meter 40 according to the invention. Modulated excitation light 41, which can originate from a single light source 1, for example, a laser or a laser diode, or from multiple lasers/laser diodes, is preferably emitted via a light amplifier 41c, in particular an erbium-doped fiber amplifier (EDFA) in an excitation beam path 41a. A beam splitter 43, which is attached at 45° in relation to the light propagation direction, for example, lets the largest part of the excitation light, for example, 99%, pass and then reflects a small fraction, for example, 1%, for reference measurement and establishment of a start signal for the receiving circuit 50 for acquiring and processing light which is backscattered or reflected from a target object 5. In the excitation beam path, following this beam splitter, the excitation light passes a semitransparent mirror ("one-way mirror") 44, which is essentially transparent for the excitation light, but is reflective for the light returning from the target object. The excitation light is then incident on a rotating mirror 45, from which it is deflected for scanning the target object 5.

The light returning from the target object 5 is deflected via the rotating mirror 45 to the semitransparent mirror 44, where it is reflected in the direction of reception beam path 46/receiving circuit 50, at the beginning of which it is incident on a detector 47a, for example, an avalanche photodiode (APD). The reception signal is then supplied in an indicated measurement signal path 48a to a waveform digitizer ("WFD") 49a.

The small fraction of the excitation light 41 reflected on the beam splitter 43 is acquired via a further detector 47b, for example, a pin diode, and supplied in an indicated reference signal path 48b to a WFD 49b embodied as a simple base version. It is to be noted that hereafter a relay of measurement and reference signals on the two detectors 47a, 47b (APD and pin diode) does not necessarily have to be performed to separate signal processing components, but rather also can be carried out by means of a shared reception electronics system suitable for processing both signals. However, it is to be noted that—as is known per se to a person skilled in the art—it is also possible to work without a dedicated reference path and, for example, calibration can be performed only via a target at a known distance (for example, in the case of a laser scanner, the support, which is hit over a small rotational angle range during each passage of the rotating mirror). The starting sign as a reference for the time measurement can also be given solely electrically, however (i.e., depending on the activation of the light source emitting the light pulse).

Figure 6:
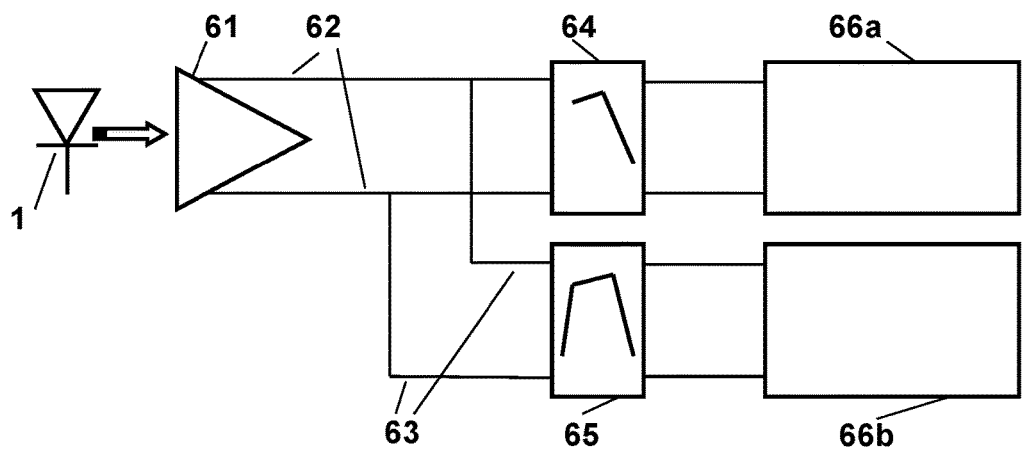
FIG. 6 shows an illustration of the path of the processing of the input signal from a detector for the returning light.

FIG. 6 illustrates the path of the processing of the input signal from a detector 61 for the returning light. The signal is amplified by an amplifier (not shown) and then split into two signal paths 62 and 63: one part is supplied via a low-pass filter 64 ("low pass") to an analog-digital converter 66a as a part of the WFD electronics ("WFD ADC") for analysis of the TOF signals, the other signal fraction is filtered using a high-pass filter 65 ("high pass") and supplied to an analog-digital converter 66b as part of the signal processing electronics system for analyzing the higher-frequency light signal trains. However, it is to be noted that the light signal trains and the TOF signal pulses can also be analyzed by the same electronics system.

Figure 7A:
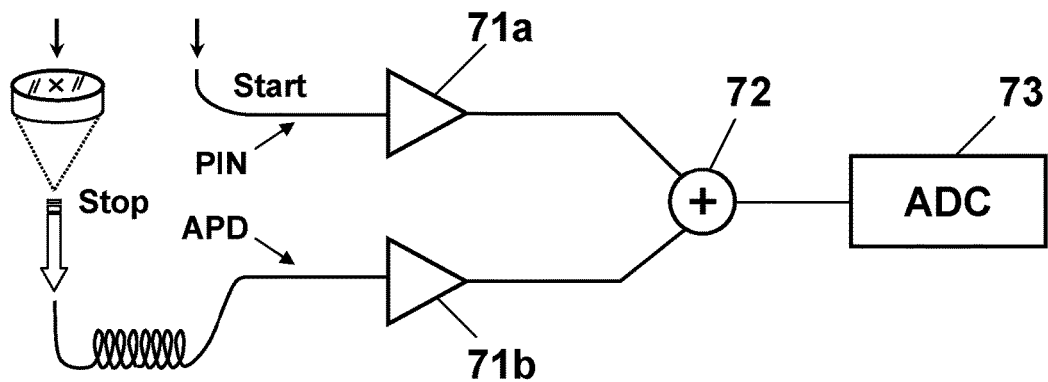
FIG. 7a shows an embodiment according to the invention of the receiver (and reference receiver) for generating and preparing the received returning signals for the respective downstream signal processing electronics system.

FIG. 7a shows an embodiment according to the invention of the receiver/the receiving circuit for generating and preparing the received returning signals (the received returning signals of the TOF pulses and light signal trains) for the respective downstream signal processing electronics system. The light signals acquired via the reception optics are preferably conducted with the aid of a fiber to a detector, in particular an avalanche photodiode (APD). To generate a start signal, respective reference signals of the emitted light signals can be supplied to a pin diode. The output signals of APD and pin photodiode are each amplified by means of trans-impedance amplifiers (TIA) 71a, 71b and then brought together or added at a processing component 72 ("+"), to then jointly be supplied to an analog-digital converter 73.

Figure 7B:
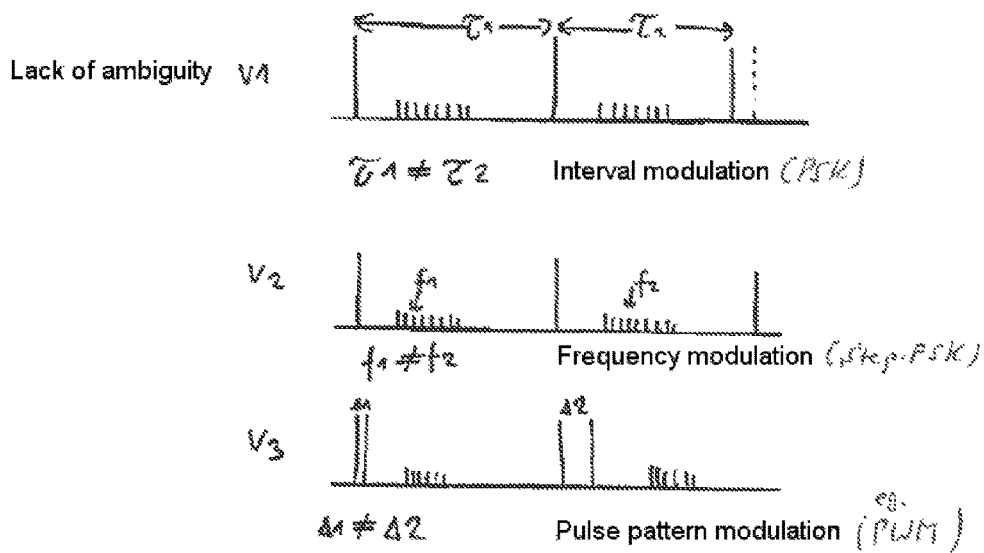
FIG. 7b shows an illustration of possible embodiments of sequential time profiles (codings) for the pulse sequence in the signal channel for the TOF signals and in the signal channel for the light signal trains.

FIG. 7b illustrates possible examples of a coding of the emitted signals to produce the lack of ambiguity for the analysis. This can be ensured, for example, in that the respective light signal trains are modulated using different patterns, i.e., the modulation of the light signal train is changed in each case after each emission of a TOF pulse (see example 2 from FIG. 7b).

Alternatively or additionally, however, this can also be performed in that the time intervals between each two emitted TOF pulses known as sequential elements vary (i.e., "interval modulation", see example 1 from FIG. 7b) or double TOF pulses were used as the respective sequential elements, and in this case the (brief) duration (the time interval) between the double pulses is varied (see example 3 from FIG. 7b).

It is apparent that these illustrated figures only schematically illustrate possible exemplary embodiments. The various approaches can also be combined with one another and with methods of the prior art.

What is claimed is:

1. An electro-optical distance measurement method comprising:
    emitting a light signal from at least one light source onto a target object;
    detecting a fraction of the light signal returning from the target object using a detector and a signal processing electronics system connected downstream from the detector; and
    determining a distance to the target object, wherein:
        the emitted light signal comprises a sequence of sequential elements of, in each case,
            at least one light pulse (P(TOF)) and
            one light signal train (P(Φ)),
        wherein the light pulses (P(TOF)) each have a higher intensity amplitude I than the light signal trains (P(Φ)), wherein:

the light pulses (P(TOF)) are each modulated so that detected fractions thereof returning from the target object are provided for being analyzed according to a pulse runtime method TOF, and the light signal trains (P(Φ)) are each modulated so that detected fractions thereof returning from the target object are provided for being analyzed according to a phase comparison method Φ, so that in each case the detected returning fractions of the light pulses (P(TOF)) are analyzed with respect to a chronological location and the detected returning fractions of the light signal trains (P(Φ)) are analyzed with respect to a phase location.

2. The distance measurement method according to claim 1, wherein:

the light pulses (P(TOF)) are configured with respect to the intensity amplitude I thereof so that the fractions returning from a target object—located in a moderate distance range—are provided for activating the detector in its upper amplitude range upon detection by the detector, and the light signal trains (P(Φ)) are configured with respect to the intensity amplitude I thereof so that the fractions returning from a target object—located in a moderate distance range—are provided for activating the detector in its linear amplitude range upon detection by the detector.

3. The distance measurement method according to claim 1, wherein:

the light signal trains (P(Φ)) each comprise a sequence of light signal train light pulses, which lie comparatively close to one another with respect to time and are emitted quasi-continuously, each of lower amplitude in comparison to the light pulses (P(TOF)), wherein the individual light signal train light pulses (P(Φ)) are emitted at a repetition frequency of between 10 MHz and 100 GHz, especially at a repetition frequency of between 50 MHz and 1000 MHz.

4. The distance measurement method according to claim 3, wherein:

the light signal train light pulses per light signal train (P(Φ)) are each accumulated on the receiver side or analysis side to ascertain an average runtime for the respective light signal train (P(Φ)) in each case.

5. The distance measurement method according to claim 3, wherein:

the light signal trains (P(Φ)) each comprise a sequence of between 2 and 50 light signal train light pulses, wherein the sequence comprises two light signal train light pulses of different amplitudes.

6. The distance measurement method according to claim 1, wherein:

the light signal trains (P(Φ)) each cover a duration of between 10 and 95% of the time interval between two successive light pulses (P(TOF)).

7. The distance measurement method according to claim 1, wherein:

the time interval (Δ(TOF)) between two successive light pulses (P(TOF)) is between 50 ns and 2000 ns.

8. The distance measurement method according to claim 7, wherein:

depending on the amplitude range, in which the detector is activated in each case by the detected returning fractions of the sequential elements, only the respective detected returning fraction of the light pulse (P(TOF)) is used with respect to a chronological location for the distance determination or only the respective detected returning fraction of the light signal train (P(ϕ)) is used for the distance determination or the respective detected returning fraction of the light pulse (P(TOF)) and the respective detected returning fraction of the light signal train (P(Φ)) are jointly used for the distance determination, wherein in each case an item of information about the determined chronological location of the returning fraction of the light pulse (P(TOF)) is taken into consideration in the scope of the analysis of the returning fraction of the light signal train (P(Φ)) of the same sequential element;

especially wherein, depending on the amplitude range, in which the detector is activated in each case by the detected returning fractions of the sequential elements, always either only the respective detected returning fraction of the light pulse (P(TOF)) is used with respect to a chronological location—more or less in the single shot method—for the distance determination or only the respective detected returning fraction of the light signal train (P(Φ)) is used for the distance determination.

9. The distance measurement method according to claim 1, wherein:

the detected returning fractions of the light pulses (P(TOF)) and light signal trains (P(Φ)) are each sampled and digitized by the signal processing electronics system and digital data are generated in this case, which are used for the further analysis.

10. The distance measurement method according to claim 9 wherein:

the digital data are processed by an FPGA, an SoC, or a microprocessor.

11. The distance measurement method according to claim 9 wherein, in the scope of the detection, the returning light signal is progressively chronologically sampled and digitized in its entirety.

12. The distance measurement method according to claim 11 wherein the returning light signal is progressively chronologically sampled and digitized in its entirety at a sampling rate of between 50 MS/s and 20 GS/s.

13. The distance measurement method according to claim 11 wherein the returning light signal is progressively chronologically sampled and digitized in its entirety at a sampling rate of between 200 MS/s and 2 GS/s.

14. The distance measurement method according to claim 1, wherein:

the light pulses (P(TOF)) and light signal trains (P(Φ)) have the same or also different carrier wavelengths.

15. The distance measurement method according to claim 1, wherein:

the light pulses (P(TOF)) and the light signal trains (P(Φ)) are emitted from the same light source or also from different light sources.

16. The distance measurement method according to claim 1, wherein:

the light pulses (P(TOF)) are emitted from a laser source and the light signal trains (P(Φ)) are emitted from a superluminescent diode SLD.

17. An electro-optical distance meter having at least one light source for emitting at least one light signal onto a target object, a receiving circuit having a detector for detecting the light signal backscattered from the target object and a signal processing electronics system connected downstream from the detector, an analysis component for determining a distance to the target object, wherein:

a controller is provided, which is configured and programmed such that the distance measurement method according to claim 16 is carried out thereby in operation.

18. The distance meter according to claim 17, wherein the at least one light source comprises at least one laser light source.

19. The distance meter according to claim 17, wherein:

the receiving circuit is provided with a sampling and digitization unit for signal sampling of the detected returning fractions of the light pulses (P(TOF)) and the light signal trains (P($\Phi$)) and generating digital data, which are then usable for further analysis.

20. The distance meter according to claim 17, wherein:

two light sources are provided, one of which is a laser source for emitting the light pulses (P(TOF)) and a superluminescent diode SLD for emitting the light signal trains (P($\Phi$)), wherein a light amplifier is arranged downstream from at least one of the two light sources in the optical beam path.

\* \* \* \* \*